United States Patent [19]

Stahl

[11] 4,322,193

[45] Mar. 30, 1982

[54] TENSION GAUGE

[76] Inventor: Keith E. Stahl, 320 B Dr., West Mifflin, Pa. 15122

[21] Appl. No.: 157,655

[22] Filed: Jun. 9, 1980

[51] Int. Cl.$^3$ ............................................. F16B 31/02
[52] U.S. Cl. ........................................ 411/11; 411/544
[58] Field of Search ................... 411/11, 10, 9, 8, 13, 411/542, 531, 147, 150, 907, 908, 544

[56] References Cited

U.S. PATENT DOCUMENTS

| | | | |
|---|---|---|---|
| 2,824,481 | 2/1958 | Johnson | 411/13 |
| 2,943,528 | 7/1960 | Curry | 411/10 |
| 3,021,747 | 2/1962 | Garrett | 411/11 |
| 3,104,645 | 9/1963 | Harrison | 411/10 X |
| 3,161,174 | 12/1964 | Harrison | 411/9 X |
| 3,174,386 | 3/1965 | Lewis | 411/10 |
| 3,329,058 | 7/1967 | Cumming | 411/11 |
| 3,456,705 | 7/1969 | Tinnerman | 411/542 X |
| 3,457,825 | 7/1969 | Caty | 411/544 |
| 3,469,492 | 9/1969 | Dahl | 411/11 |
| 3,948,141 | 4/1976 | Shinjo | 411/10 |
| 4,047,463 | 9/1977 | Coldren | 411/12 |
| 4,137,816 | 2/1979 | Gartner | 411/9 X |
| 4,170,163 | 10/1979 | Payne | 411/11 |

*Primary Examiner*—Ramon S. Britts
*Attorney, Agent, or Firm*—Webb, Burden, Robinson & Webb

[57] ABSTRACT

A tension gauge for indicating the tension on a fastener such as a mine roof bolt is a non-metallic right circular cylinder having a central bore and an axial thickness between parallel top and bottom surfaces. A plurality of radially extending holes is equally spaced around the perimeter of the cylinder, an end of each hole in communication with the bore and/or an end opening in the perimeter of said cylinder. Preferably, there are six such holes disposed at 60° intervals about the cylinder bore. The central axis of each hole lies in a plane which is parallel to and substantially equidistant from the planes of the top and bottom surfaces.

The cylinder is formed of a one-piece, compressible, organopolymeric material, such as high density polyethylene, which is capable of flowing under compression resulting from tension on the fastener less than that tension which will overstress the fastener. In use, the cylinder is positioned on a mine roof bolt between a roof plate having an annular rib and a washer adjacent the driving head of the bolt. As the bolt is tightened, the tension gauge is compressed to such an extent that the organopolymeric material flows radially and axially. The bolt is properly torqued when the material is compressed to the point where it can be visually observed that the dimples formed in the material have reached the level of the visible bottom surface of the washer and the material between the dimples extends only a short distance below the bottom surface. The gauge provides an indication of undertension, proper tension and overtension.

6 Claims, 12 Drawing Figures

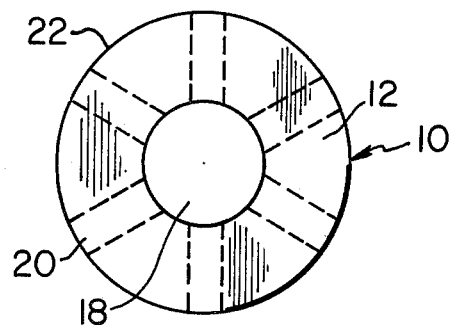
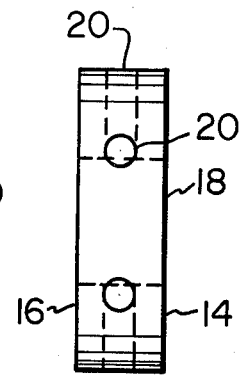
Fig. 1  Fig. 2
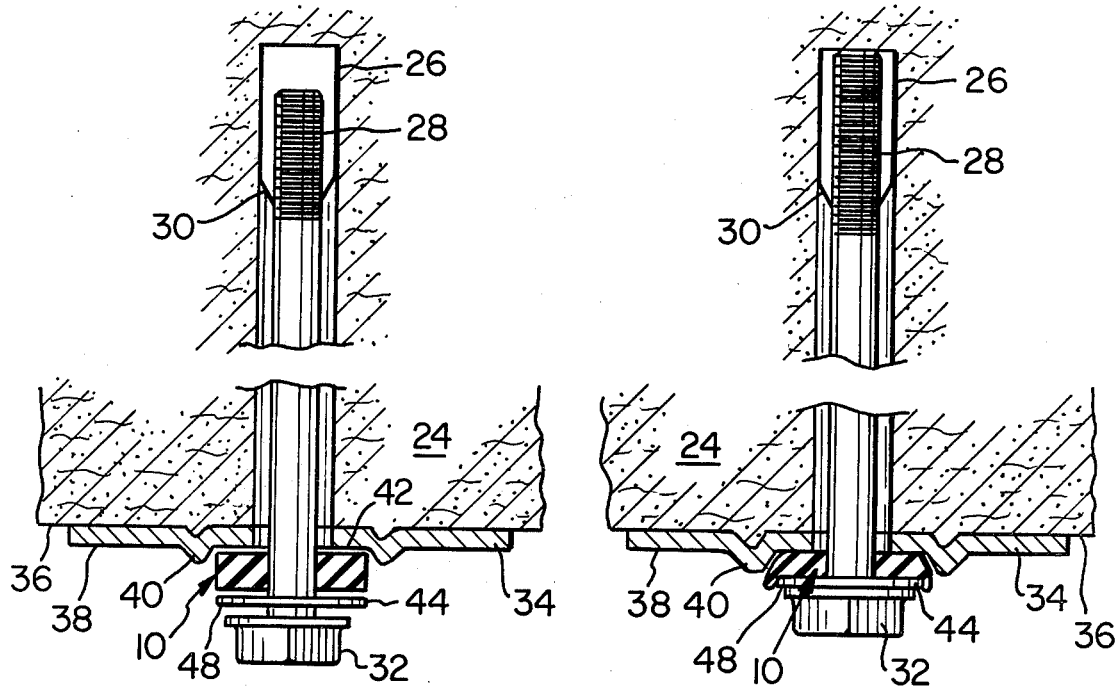
Fig. 3A  Fig. 4A

TENSION GAUGE

BACKGROUND OF THE INVENTION

This invention relates to tension gauges, and especially to a tension gauge for indicating proper tension on a fastener such as a mine roof bolt. The tension gauge according to the invention indicates not only overtension on the bolt, but undertension and proper tension as well.

It is well known in the mining art that it is necessary to reinforce formations of rock and other strata above the mine roof. It is conventional to drill bore holes in the mine roof and insert therein mine roof bolts which are on the order of six or more feet in length. The bolts are anchored on one end by expansion means and are provided with a plate which is pressed against the mine roof by torquing the mine bolt into the hole. As the bolt is rotated, it causes the expansion means to secure the bolt in the hole. As the bolt is tightened by rotation, it is subjected to tension. However, if the bolt is not properly torqued, undertension results and if the bolt is overtorqued, overtension results. In either case, such an installation is unsatisfactory for it means that an unsafe condition is created wherein the mine roof could fall on personnel working in the mine.

Presently, it is the usual practice to hand check tension on mine roof bolts with a torque wrench. However, hand checking involves a potential safety hazard to the checker since he is unprotected; it is also cumbersome and time-consuming. Therefore, efforts have been made to provide some sort of simple means for indicating when a mine roof bolt is properly tensioned. Heretofore, tensioning devices have been unsatisfactory because they indicate only when a bolt is overtensioned, that is, when it is torqued too much. Other tensioning gauges have been unduly complicated and therefore are expensive to manufacture.

It is, of course, desirable that such gauges be very inexpensive since thousands and thousands of them are used, that they not be unduly complicated, and that they be disposable. They should be easy for the operator to see and must be designed to deform at the proper tension.

Prior art tensioning devices include those disclosed in the following U.S. Pat. Nos. 2,824,481; 3,329,058; 4,137,816; 3,104,645; 4,170,163; 3,174,386; 3,161,174; 4,047,463; and 2,943,528. A typical tension or stress indicating device is disclosed in U.S. Pat. No. 3,174,386, which comprises a washer means which is disposed coaxially adjacent a roof bolt between a mine roof plate and a driving head or washer associated therewith. The washer means consists of an axial and radial expanse of solid compressively-plastic material, such as mild steel or high strength nonferrous metals. According to the patent, the material has a plastic yield strength less than that of any of the other parts of the fastener with the expanse being adapted to plastically deform axially and radially under fastener tension and take a permanent plastic set so as to directly respond to and sense the tension to permit the operator to ascertain the tension. The preferred washer constitutes a spacer and sensing member which is a simple hollow right cylinder having an axial extent greater than that necessary to space the adjacent pressure plate from the adjacent one of the connected surfaces, namely the roof bolt head, when the roof bolt is tightened, the excess extent of the cylinder of the washer having a direct precalibrated proportion to the predetermined installation tension of the roof bolt when the cylinder is axially compressed by the roof bolt head sufficiently to eradicate the excess extent. The axial shortening of the cylinder sufficient to eradicate the excess length exceeds the limiting elastic strain of the cylinder and effects indication of the predetermined tension. In the patent, it is disclosed that the right cylinder includes a central portion which is reduced relative to the outside axial portions such that upon tightening of the roof bolt, a crimp is formed which provides a visual indication to the operator that the bolt is under tension. However, it is not possible to state whether when the crimp is fully collapsed the bolt is properly tensioned and it is not possible to tell from visual observation whether the bolt is undertensioned because it is not possible to determine the extent of the crimp. In any event, although the patentee states that when the crimp has been flattened, rotation of the bolt should cease as further rotation will then increase the tension in the bolt beyond the ultimate yielding capacity of the device, as a matter of fact, when the crimp is formed, tension on the bolt is released and there is nothing to indicate that proper tension will be obtained again.

SUMMARY OF THE INVENTION

I have invented a tension gauge for indicating the tension on a fastener such as a mine roof bolt. In its broadest concept, my invention is a gauge in which the gauge material, thickness, diameter, number of holes, hole spacing, location and size of holes is so correlated that tension of a mine roof bolt utilizing the gauge can be determined by sight. In a more specific sense, my invention is a gauge comprising a non-metallic right circular cylinder having a central bore and an axial thickness between parallel top and bottom surfaces. A plurality of radially extending holes is equally spaced around the perimeter of the cylinder, an end of each hole in communication with the bore and/or an end opening in the perimeter of said cylinder. Preferably, there are six such holes disposed at 60° intervals about the cylinder bore. The central axis of each hole lies in a plane which is parallel to and substantially equidistant from the planes of the top and bottom surfaces.

The cylinder is preferably formed of one-piece, compressible, organo-polymeric material, such as high density polyethylene, which is capable of flowing under compression resulting from a torque on the fastener less than that torque which will overstress the fastener with which it is used, such as a mine roof bolt. In use, the cylinder is positioned on a mine roof bolt between a roof plate having an annular rib and a washer adjacent the driving head of the bolt. As the bolt is tightened, the tension gauge is compressed to such an extent that the organo-polymeric material flows radially and axially. The bolt is properly torqued when the material is compressed to the point where it can be visually observed that the dimples formed in the material have reached the level of the visible bottom surface of the washer and the material between the dimples extends only a short distance below the bottom surface. The gauge provides an indication of undertension, proper tension and overtension.

BRIEF DESCRIPTION OF THE DRAWINGS

In the Figures:

FIG. 1 is a top plan view of a tension gauge in accordance with my invention;

FIG. 2 is a side elevation view of the tension gauge;

FIG. 3A is a partial sectional view showing the roof of a mine with the tension gauge applied to a mine roof bolt in the untensioned condition;

FIG. 4A is a bottom plan view of the assembly shown in FIG. 3A;

DETAILED DESCRIPTION OF PRESENTLY PREFERRED EMBODIMENTS OF THE INVENTION

Figure 3B:
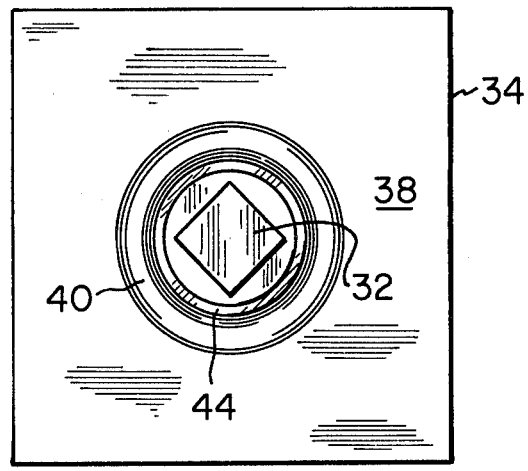
FIG. 3B is a partial sectional view showing the roof of a mine with the tension gauge applied to a mine roof bolt in the tensioned condition.

Referring to FIGS. 1 and 2, a tension gauge 10 of a high density polyethylene material comprises a right circular cylinder 12 having a top surface 14 and a bottom surface 16. A central axial bore 18 extends through the cylinder. Six holes 20 extend radially around the bore 18. They are spaced at intervals of 60° from one another. One end of each hole 20 is in communication with the bore 18 and the other end of each hole opens in the perimeter 22 of the cylinder. The central axis of each hole 20 lies in a plane which is parallel to and substantially equidistant from the planes of the surfaces 14, 16.

One presently preferred gauge design is a right circular cylinder of high density polyethylene material having a diameter of 2" and a thickness of ½". The central axis bore is ¾" and each radial hole is ¼" diameter. I have found that such a gauge will accurately indicate visually a torque of 120–135 ft-lbs which is the equivalent of a proper tension on the bolt as determined by the bolt manufacturer. By changing the radial hole diameter to 7/32", a torque of 135–150 ft-lbs can be accurately indicated visually. It will be apparent to those of ordinary skill that when more than six radially extending holes are employed, the diameter of the holes must be smaller and that if fewer holes are used, the hole diameter must be larger assuming that the gauge material and desired tension on the bolt remain constant. Since mine roof bolts are usually designed to be torqued to 120 to 160 ft-lbs, the two exemplary sizes given cover most of the mine roof bolt installations now made.

FIGS. 3A and 4A show the gauge in place on a mine roof bolt installation prior to final tightening. The installation, which is made in a rock formation 24, includes a vertical bore hole 26 in the formation 24. A mine roof bolt 28 is secured in the hole 26 by an expansible anchor means 30 on one end which expands into the formation 24 as the bolt is torqued by turning the driving head 32 of the bolt. There is a roof plate 34 which, upon torquing, is drawn up against the roof 36 of the mine. The plate is conventional and includes a substantially flat surface 38 having an annular rib 40 which extends around a central opening 42 in the surface 38. A tension gauge 10 in accordance with my invention is located on the bolt 28 adjacent the roof plate 34 within the annular rib 40. A metal washer 44 which is usually about 2" in diameter and about 1/16" in thickness is provided between the gauge 10 and the driving head 32 on the bolt.

Figure 4B:
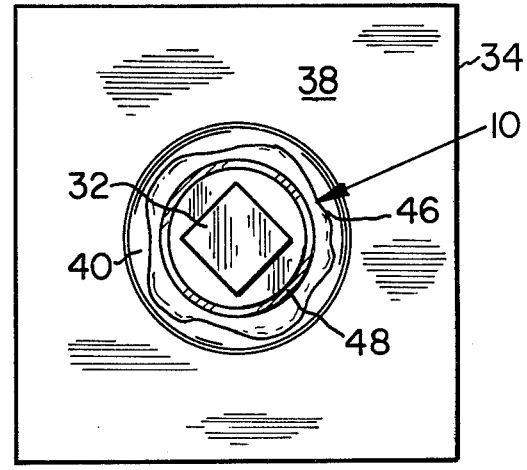
FIG. 4B is a bottom plan view of the assembly shown in FIG. 3B.

As the head 32 of mine roof bolt 28 is driven, the bolt 28 is put under greater and greater tension with the plate 34 in abutment with the mine roof 36 as shown in FIGS. 3B and 4B. As shown, the bolt 28 is anchored at one end in the bore hole 26, the plate 34 is drawn up against the mine roof 36 and the gauge 10 has been compressed to the point where the high density polyethylene material has flowed axially and radially outwardly and into the space between the metal washer 44 and the inside edge of the annular rib 40. By visually observing the flow of the polyethylene material as the bolt is torqued, the operator can determine whether the bolt is undertensioned, properly tensioned or overtensioned. As shown in FIG. 4B, the polyethylene flow is slightly uneven radially, due to the presence of the radially extending holes in the gauge, such that a plurality of circumferentially spaced dimples 46 are formed. By observation, when the dimples reach the level or plane of the visible bottom surface 48 of the washer 44, proper tension has been applied to the roof bolt. If the dimples 46 have not reached the level or plane of the surface 48, the bolt is under-tensioned. And, if the dimples pass the level or plane of surface 48, the bolt is overtensioned. In addition, if the material flow between the dimples, which is readily apparent to the operator, extends substantially below the surface 48, upon visual observation, the bolt is overtensioned. From tests, I have determined that the material flow should not exceed approximately ⅛" below the steel washer surface 48.

FIGS. 5A thru 5E comprise a series of views showing the tension gauge in various operative conditions. From these views it will be appreciated that in use the tension gauge 10 according to the invention is compressed as distinguished from being collapsed and that the tension applied to a mine roof bolt can be accurately determined by visual observation of the flow of polyethylene material in characteristic dimples and peaks.

Figure 5A:
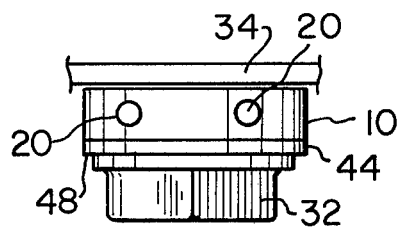
FIGS. 5A thru 5E show the tension gauge in various operative conditions.

Referring to FIG. 5A, the tension gauge 10 is shown in its noncompressed condition between a roof plate 34 and washer 44 which is in abutment with the driving head 32 of a roof bolt which is not in tension. Radial holes 20 are circular in cross-section.

Figure 5D:
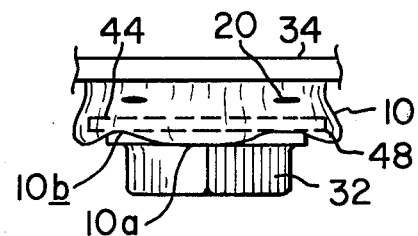
Figure 5B:
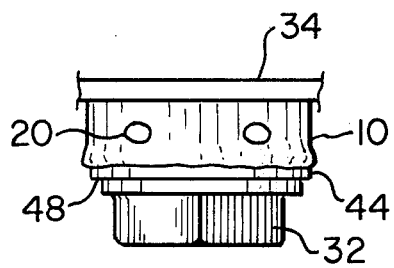

In FIG. 5B, some tension has been applied to the roof bolt by rotating driving head 32. This results in partial compression of the gauge 10 between roof plate 34 and washer 44, causing deformation of the cross-sections of radial holes 20. As the gauge is compressed axially, the holes 20 tend to be reduced in their major dimensions in cross-section.

Figure 5E:
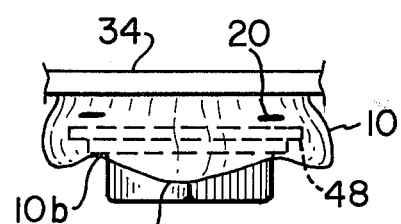
Figure 5C:
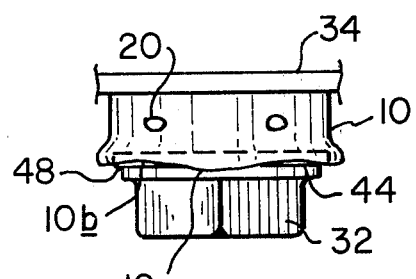

Upon further rotation of driving head 32, resulting in more tension being applied to the roof bolt, the gauge 10 is further compressed between plate 34 and washer 44 as shown in FIG. 5C. In this view, the radial holes 20 are further deformed and become smaller in cross-section, and axial and radial flow of polyethylene material is evident along the lower edge of gauge 10 defining peaks 10a and dimples 10b. Visually it is observed that the peaks are only slightly below bottom surface 48 of washer 44 and the dimples are slightly above surface 48. If tightening of the bolt ceased in this condition, the bolt would be undertensioned as shown by the gauge 10.

Additional rotation of the driving head 32 and thus tightening of the mine roof bolt, as shown in FIG. 5D, causes still further compression of the gauge 10 with consequent flattening of radial holes 20. In this condition of compression of the gauge 10, the dimples 10b are substantially at the level or plane of surface 48 of washer 44 and peaks 10a are slightly below that surface. I have found that the configuration of the gauge 10 shown in FIG. 5D represents proper tensioning of the roof bolt. I have also found that if the peaks extend more than about ⅛" below the surface 48 for a cylindrical gauge of high density polyethylene, of 2" diameter and ½" thickness having six holes as shown in FIG. 1, proper tension will be exceeded.

Such an overtensioning condition is illustrated in FIG. 5E. As shown, the gauge 10 is under compression, radial holes 20 are flattened, the dimples 10b are below surface 46 of washer 44 and the peaks 10a are substantially below surface 48.

From FIGS. 5A through 5E, it is clear that by visual observation of the material flow of gauge 10 during application of tension to a roof bolt carrying the gauge, an operator can apply proper tension to a roof bolt without the necessity of hand checking his work with a torque wrench.

I have found that a gauge made of high density polyethylene material is especially satisfactory because the polyethylene material is sufficiently rigid that it can maintain tension with time and is not subject to corrosion. Polyethylene is relatively inexpensive and therefore, disposable. In addition, it can be fabricated easily in volume.

Although my preferred gauge diameter of 2" was selected because that diameter matches conventional washers now used, it will be apparent that the diameter can be changed to match a different sized washer, or if the washer is eliminated, as it may be, a driving head having a different diameter.

I have also selected ½" as a preferred thickness for my gauge. I have found that a gauge having such thickness is easily visible from several feet, where the operator is positioned, and is thin enough that it does not require an excessive amount of material. In addition, I have found that the ½" thickness is sufficiently rigid that it does not lose tension over time.

Equal spacing of the radially extending holes in my gauge provides uniform compression of the gauge under tension. While a 60° spacing is preferred because it provides an accuracy range of ±15 ft-lbs., fewer or more holes may be used. However, I have found that with fewer holes, it becomes more difficult for the operator to judge when the dimples resulting from flow of the polyethylene reach the level of the visible bottom surface of the washer, or in the absence of a washer, the surface of the driving head. Moreover, I have also found that if the gauge has more than 6 holes, it is possible for the operator to become confused as to the proper level of the dimples since there is not a clear line of demarcation along the edge of the gauge resulting from the compressed polyethylene material.

Figure 6:
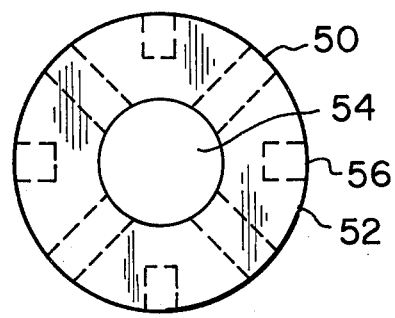
FIG. 6 is a top plan view of a modification of the tension gauge.

Finally, while in my preferred gauge, the radially extending holes lie along a plane which is substantially parallel and equidistant from the top and bottom surfaces of the gauge, the holes can be placed closer to one surface or the other, although the results will not be as consistent. In addition, in some applications all of the radially extending holes do not need to be drilled completely through from the perimeter to the axial bore of the cylinder, but only part-way through so as to form blind holes as shown in the gauge illustrated in FIG. 6.

It has been found that where eight holes are provided, four holes 50 at right angles to each other, drilled completely through from the perimeter 52 to the central axial bore 54 and four blind holes 56 are drilled part way from the perimeter 52 toward the bore, a torque tolerance of 7–10 ft-lbs., may be obtained. It is believed that this configuration may be more accurate (i.e. closer tolerance) because there is both internal and external uniformity in the concentration of material in the cylinder, due to the presence of substantially equivalent material volume adjacent the central axial bore 54 and adjacent the perimeter 52 of a gauge which is so designed. However, this design is not preferred over that earlier described because it is more difficult to fabricate.

Having described presently preferred embodiments of the invention, it should be understood that it may be otherwise embodied within the scope of the appended claims.

I claim:

1. In a mine roof bolting assembly including a mine roof bolt for expansible engagement with a bore hole drilled into the roof of a mine and a mine roof plate having a central opening surrounded by an annular rib which is adapted to be pulled against the mine roof by applying tension to the bolt through a nut threaded to the bolt, and a washer disposed on the bolt between the plate and the nut, the improvement in a tension gauge for indicating tension on the bolt comprising:
   A. a non-metallic right circular cylinder disposed on the bolt between the plate and the washer and having a central bore and an axial thickness between parallel top and bottom
   B. a plurality of radially extending holes substantially equally spaced around the perimeter of the cylinder, the central axis of each hole lying in a plane which is parallel to the planes of the top and bottom surfaces, and
   C. an end of each hole in communication with at least one of the bore and the perimeter whereby when the gauge is employed with a bolt and within the annular rib the compression of the gauge by tightening the nut on the bolt results in flow of the non-metallic material with respect to the washer which is visually indicative of the tension on the bolt.

2. The improvement set forth in claim 1 wherein the material is an organo-polymeric material.

3. The improvement as set forth in claim 2 wherein the material is polyethylene.

4. The improvement as set forth in claim 1 wherein there are six radially extending holes, an end of each hole being in communication with the bore and with the perimeter of the cylinder, the six holes being spaced at approximately 60° intervals around the cylinder.

5. The improvement as set forth in claim 1 wherein the central axis of each hole lies on a plane which is substantially equidistant from the planes of the top and bottom surfaces of the cylinder.

6. The improvement as set forth in claim 1 wherein the radially extending holes are in communication with both the axial bore and the perimeter of the cylinder.

* * * * *

UNITED STATES PATENT AND TRADEMARK OFFICE
CERTIFICATE OF CORRECTION

PATENT NO. : 4,322,193
DATED : March 30, 1982
INVENTOR(S) : Keith E. Stahl

It is certified that error appears in the above—identified patent and that said Letters Patent are hereby corrected as shown below:

Claim 1 - Column 6 - Line 32 After "bottom" insert --surfaces,--.

Signed and Sealed this

Twenty-fifth Day of May 1982

[SEAL]

Attest:

Attesting Officer

GERALD J. MOSSINGHOFF

Commissioner of Patents and Trademarks